Figure 6:
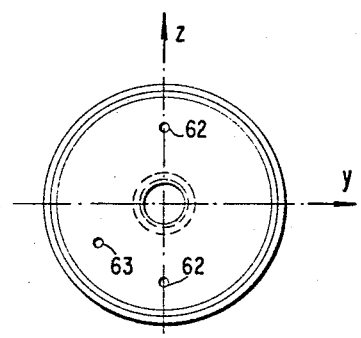

June 25, 1968     H. C. SONDEREGGER     3,390,287
PIEZO-ELECTRIC BUILDING UNITS
Filed Dec. 8, 1965     2 Sheets-Sheet 1
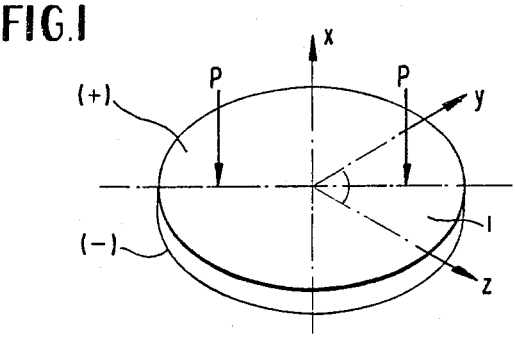
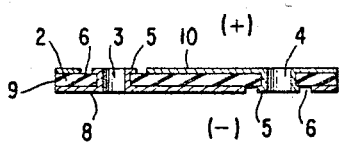
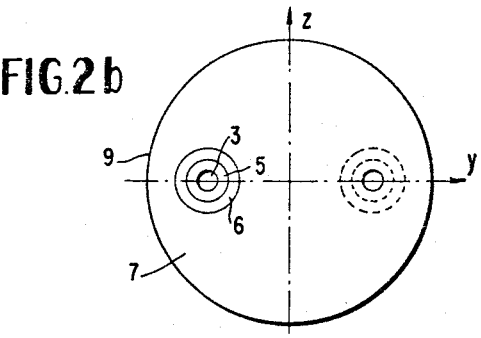
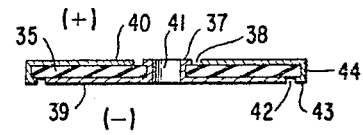
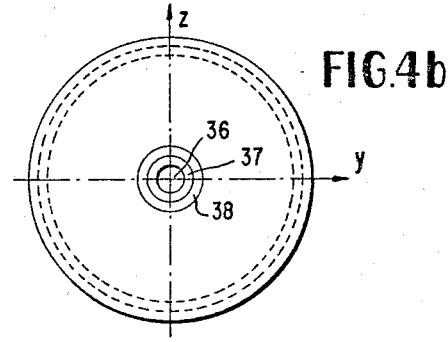
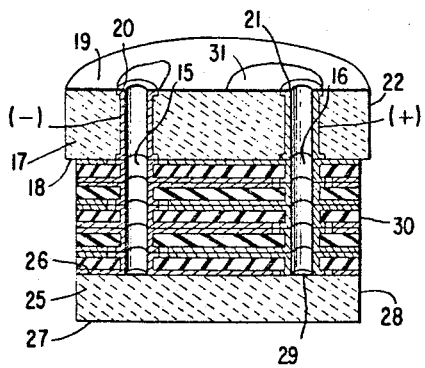
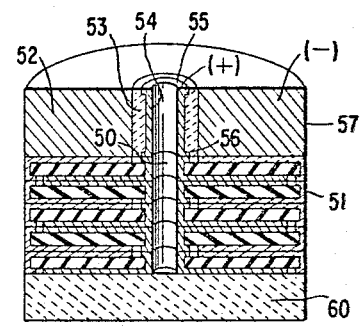
INVENTOR
HANS CONRAD SONDEREGGER
BY Craig & Antonelli
ATTORNEYS United States Patent Office 3,390,287
Patented June 25, 1968

3,390,287
PIEZO-ELECTRIC BUILDING UNITS
Hans Conrad Sonderegger, Sulz-Rickenbach, Switzerland, assignor to Kistler Instrumente AG., Winterthur, Switzerland
Filed Dec. 8, 1965, Ser. No. 512,450
Claims priority, application Switzerland, Dec. 10, 1964, 15,994/64
15 Claims. (Cl. 310—9.6)

This invention relates to piezo-electric building units which can be inserted in a simple manner into measuring value converters or transducers for the measurement of pressure, force or acceleration.

The prefabricated building units consist of a number of piezo-electric discs which are disposed between a cover plate and a conductive base plate and which are all assembled together to form a compact unit. It is of importance that the highly sensitive insulating areas which separate the negative and positive conductive layers are located completely in the interior of the unit. For this reason no particular care is necessary when the building unit is inserted. The building units themselves are cleaned in an ultra pure atmosphere, mounted and finally finished in a vacuum. Thereby it is ensured that the insulation resistance of the insulating areas which are sensitive to the smallest contamination does not suffer any reduction. Since the various discs of the building units are assembled together perfectly tightly in a vacuum by known methods a later penetration of moisture into the transducers does not lead to the complete loss of insulation since the insulated areas outside the building unit, that is to say from the base plate onwards, are considerably larger than inside the building unit.

The piezo-electric portion of the building unit consists of a number of piezo-electric discs which may consist of quartz crystal or another piezo-electric material and which utilise the direct or longitudinal piezo effect. Furthermore they are provided with one or two openings for conducting away the charges. The provision of two conducting openings is suitable in particular for the production of so-called symmetrical transducers, i.e. transducers in which the negative and positive charges can be conducted away isolated from the transducer housing.

The cover plate and conductive base plates may consist of ceramic material which has a co-efficient of expansion which is as close as possible to that of the piezo-electric material. The conductive base plate has the same openings as the piezo-electric discs whereas the cover plates consist mainly of one piece. The conductive base plate however may consist alternatively of a metal into which one or two ceramic tubular members are snugly inserted which in turn are constructed internally as conductive bodies and externally as insulating bodies.

The invention utilises partly known methods of the thin film technique such as practised for years in the construction of electronic components.

Figure 7:
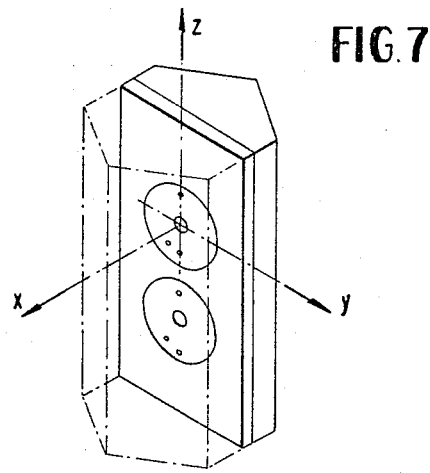
Figure 8:
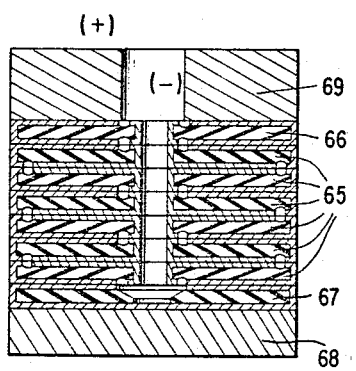
Figure 12:
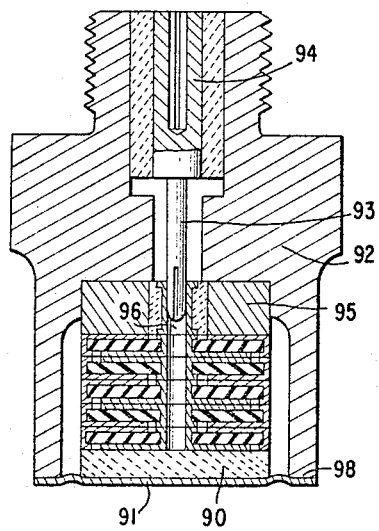
Figure 10:
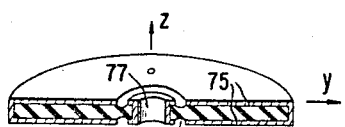
Figure 9:
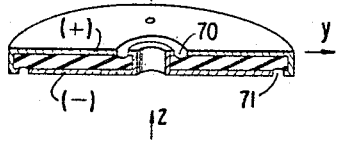
Figure 11:
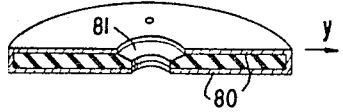

Some embodiments of the invention and further features thereof are described below by way of example with reference to the accompanying drawings, in which:

FIG. 1 illustrates a piezo-electric disc cut in accordance with the direct or longitudinal effect, FIGS. 2a and 2b illustrates also a piezo-electric disc having two conductive openings and corresponding metallised surfaces, in section and in plan view, FIG. 3 illustrates a piezo-electric building unit using a plurality of the piezo-electric discs illustrated in FIG. 2, in section, FIGS. 4a and 4b illustrate a piezo-electric disc with one conductive bore and the corresponding metallised surfaces, in section and in plan view, FIG. 5 illustrates a piezo-electric building unit using a plurality of the piezo-electric discs illustrated in FIG. 4, in section, FIG. 6 illustrates a piezo-electric disc with a central opening and three marking points, FIG. 7 illustrates how the discs can be drilled directly from a crystal plate by means of a supersonic drilling machine, FIG. 8 illustrates an assembly of an even number of piezo-electric discs with cover and conductive base plates of the same material, FIG. 9 illustrates a piezo-electric disc with three marking points and two concentric insulating grooves, FIG. 10 illustrates a conductive base plate of piezo-electric material which is short-circuited by a metallising process, FIG. 11 illustrates a cover plate of piezo-electric material also short-circuited by a metallising process, and FIG. 12 illustrates a piezo-electric building unit with a diaphragm welded thereto.

In accordance with FIG. 1 mechanical forces are operative parallel to the axis and produce on the two circular surfaces of the discs positive and negative charges marked + and —, respectively, as soon as a force occurs. The Y axis lies in the plane of the disc; it is of importance inasmuch as compression forces along this axis produce also positive and negative charges on the circular surfaces. The neutral or Z axis lies also in the surface of the discs offset 90° relatively to the Y axis. It is of further important significance that the co-efficients of expansion of different piezo-electric materials are highly different along the Y and Z axes. Therefore particular measures are imperative in order to avoid that when a plurality of piezo-electric discs and end plates of different materials are assembled together the compression stresses do not attain too high a value which could lead to excessive temperature drift at temperature changes.

According to FIG. 2 a basic element, i.e. a piezo-electric plate 2 is provided with two openings 3 and 4. These openings are disposed on the Y axis at a certain distance from the centre. After the mechanical finishing process the plates are pre-treated chemically and subsequently provided by chemical means with a layer of silver on all surfaces. Thereupon a layer of gold is vapour deposited on the two circular surfaces. Subsequently the combined metal layer on the peripheral surface 9 is removed by lapping or polishing, also the two circular insulating surfaces 6. The one insulating ring is provided on the positive side 10, the other one on the negative side 8. The width of the insulating ring must be found empirically and must be so great that in operation a sufficiently high insulation is ensured continuously. When quartz crystal is used as plate material insulation values of $10^{14}$ ohm can be obtained with a width of the insulating ring of $\frac{1}{10}$ mm. The insulating ring is disposed so that the inner wall of the openings 3 and 4 remains in connection with a sufficiently wide conductive ring 5. In this manner the conductive opening is produced which connects the metallised surface of the one side to a conductive ring on the other side.

If according to FIG. 3 a number of piezo-electric discs as shown in FIG. 2 are superimposed upon each other in such manner that always the negative and positive surfaces lie on each other the conductive tube 15 for negative charges and a conductive tube 16 for positive charges are automatically produced by the openings 3 and 4. The conductive base plate 17 which consists for example of a highly insulating ceramic material is provided with similar openings as the piezo-electric plates 2. The contact surface 18 is thereupon metallised in the same manner, also the openings 15 and 16. Only contact rings 20 and 22 are provided on the conductive base plate 19; the remainder of the metallised surface 19 as also the conductive peripheral surface 22 are etched away.

The cover plate 25 consists normally also of a ceramic material. Obviously it is also possible to prevent a deposition of metal by screening. Furthermore the conventional lapping and polishing methods may be used for removing the metallising.

In this manner a building unit is produced which is completely free of charges on its peripheral surfaces 22, 30, 28, this being of great advantage in many cases.

If this feaure is not required a somewhat simpler arrangement according to FIGS. 4 and 5 leads also to success.

According to FIG. 4 the piezo-electric disc 35 has a central opening 36. The disc has also been metallised by the described method. Subsequently the negative surface 39 at the outer periphery is interrupted by an annular insulating surface 42. In contrast it is connected by means of the ring surface 41 to the contact ring 37 which in turn is separated from the positive surface 40 by an annular insulating surface 38. This surface is connected to the contact ring 43 by way of the conductive peripheral surface 44.

If according to FIG. 5 a number of discs is superimposed in such manner that always positive and negative surfaces come to rest upon each other again a conductive tube 50 is produced which conducts negative charges, whereas the positive charges are guided to the conductive base plate 52 by the metallised peripheral surfaces 51.

The conductive base plate 52 may consist for example of metal into which is inserted a ceramic bush 53 which in turn is provided with a metallised inner surface 54 and with annular contact surfaces 55 and 56. Alternatively it would be possible to produce the conductive base plate 52 completely of ceramic material in which case then the peripheral surface 57 would have to be utilised for conducting the charges.

The cover plate 60 is normally also produced from a ceramic highly insulating material. In this manner a piezo-electric building unit is produced the piezo plates of which can be rotated during assembly referred to the Y axis to any required angle.

Both principal arrangements have the advantage that the very thin piezo-electric discs have completely undisturbed circular peripheral surfaces which have neither grooves nor other interruptions which could easily lead to cracks. Also the assembly can be carried out very simply and accurately provided accurately fitting centering pins are inserted into the openings.

For the purpose of assembling the piezo-electric building units the carefully prepared individual parts are cleaned in an ultra pure atmosphere and are subsequently welded together in a high vacuum by means of the known thermocompression method to form a compact unit.

In cases in which the piezo-electric building unit is assembled with a mechanical pre-stressing, welding together of all parts is not absolutely necessary. Generally it is then sufficient that the unit is immersed in the assembled and compressed state in a solution of silicon varnish; this leads to a cohesion of the whole parcel which is sufficiently solid for assembly in the transducer. The highly insulating ring portions in the interior of the building units are not touched by the silicon varnish under any circumstances so that the high insulation resistance is maintained. However the silicon varnish prevents moisture from extending to the sensitive parts of the building unit.

Both constructions have certain advantages. The completely welded building unit leads to a slightly higher natural frequency because of the reduced gap resilience; the unit immersed in silicon varnish has a slightly better resistance to temperature shock with less drift since the surfaces of the materials with the different co-efficients of expansion can slide slightly relatively to each other.

For measuring value converters or transducers which must operate within large temperature changes and where a completely welded building unit is necessary an arrangement according to FIG. 8 is proposed. According to this, piezo-electric discs 65 are disposed between a conductive base plate 66 and a cover plate 67 which consist of the same material. This is important in particular when quartz crystal is used because of the different co-efficients of expansion in the Y and Z axes. In order to prevent compression stresses within the piezo-electric building unit all discs are mounted in the same direction referred to the Z axis. For the purpose of identifying this axis and the polarity according to FIG. 6 three marking points 62 and 63 are disposed on the surface. This is effected directly during the cutting out process of the crystal plates as illustrated in FIG. 7. According to FIG. 9 the inner and outer insulating portions 70 and 71 respectively are formed by grooves in the shape of a circle segment. The grooves are worked slightly into the piezo-electric material which can be effected by mechanical manipulation or by supersonic sound. Thereby an increased insulation is secured.

The conductive base plate in FIG. 10 consists of the same piezo-electric material and is arranged in the same direction relatively to the axes; it is short-circuited electrically by a continuous metal surface 75. Merely the central conductive opening 77 is separated from the positive surfaces 75 by two insulating grooves 76.

The cover plate illustrated in FIG. 11 consists also of the same piezo-electric material and is again arranged in the same direction with reference to the axes; it is also short-circuited by metal surfaces 80. An insulating phase 81 is provided in the centre opening. Owing to the fact that now all discs of the piezo-electric building unit consist of the same material and are generally aligned in the same direction relatively to the Z axis, lowest compression stresses are produced in the unit through temperature changes. Such stresses occur only in the built in state when the building unit is assembled between metallic materials 68 and 69. In this case however the conductive base plate 66 and the cover plate 67 take over the compression stresses which however cannot produce additional voltages because of the short circuiting.

One example of the use of the piezo-electric building unit for a pressure converter is illustrated in FIG. 12. In this case the cover plate 90 has been welded to the internally gold coated diaphragm 91 prior to the assembly in the converter by means of ultrasonic sound or by the thermocompression method. Thereupon the completely welded unit is forced into a transmitter body 92. The take-off electrode 93 is forced directly into the conductive tube 96 of the conductive base plate 95 during the assembly of the plug portion 94. The diaphragm 91 is gold-coated only on the contact surface with the building unit so that it can be connected to the transmitter body 92 by means of a conventional circular edge weld 98.

Owing to the fact that a completely welded piezo-electric building unit is used the use of a mechanical pre-stressing sleeve can be omitted which has a favourable effect upon the temperature characteristic.

Thus the invention enables piezo-electric building units to be produced in which the highly insulating very sensitive points are disposed in the interior completely sealed off so that mounting into the measuring value converters or transducers is possible without any special precautions and whereby unusual reliability of operation is assured. This is of particularly great importance when the measuring value converter or transducer is utilised for quasistatic measurements in which case insulation values of $10^{13}$ ohm are absolutely necessary. Moreover the invention enables the construction of symmetrical measuring value converters or transducers since the positive and negative charges can be conducted away completely in the interior of the piezo-electric building units whereby they are separated from the potential of the transducer housing. Furthermore the piezo-electric discs according to the invention have no incisions in the peripheral surface which is of great advantage for the danger of cracking of the brittle material. Moreover the invention permits the charges to be guided away perfectly from the building unit to the respective parts of the measuring value converter.

The invention can be designed for a high natural frequency of the measuring converter by means of welding of the piezo-electric building unit, as well as for low temperature drift by means of cohesion with a coating of silicon varnish.

By using short-circuited conductive base plates and cover plates of the same piezo-electric material and alignment of all discs in the same direction relatively to the Z axis a welded building unit can be produced which has a low temperature drift.

Thus the invention enables important improvements to be obtained in respect of simplicity of assembly, reliability of operation and temperature characteristic.

What we claim is:

1. A piezo-electric building unit for use in a transducer, such as a measuring value converter, for pressure force and acceleration comprising
    a plurality of piezo-electric discs having first and second metallized surfaces and at least one aperture therethrough, said first metallized surface extending through said aperture and being separated from second metallized surface by a first annular gap, said discs being stacked with first metallized surfaces contacting only first metallized surfaces and second metallized surfaces contacting only second metallized surfaces,
    a base plate disposed at one end of said stack of discs and having at least one aperture in alignment with said aperture in said discs and
    a cover plate disposed at the other end of said stack of discs and having at least one aperture in alignment with said aperture in said discs,
    said second metallized surface extending through said aperture on each disc contacting corresponding surfaces on adjacent discs of said stack so as to form a conductive tube extending through said stack.

2. A piezo-electro building unit as defined in claim 1, wherein said discs contain two through apertures, said first metallized surface extending through one of said apertures and said second metallized surface extending through the other of said apertures thereby forming a pair of conductive tubes extending through said stack of discs.

3. A piezo-electric building unit as defined in claim 2, wherein said piezo-electric discs have uninterrupted cylindrical peripheral surfaces.

4. A piezo-electric building unit as defined in claim 2, wherein said apertures are removed from the outer peripheral surface of said discs to such an extent that said annular gap between conductive surfaces is completely surrounded by a conductive surface whereby said gap is completely enclosed in the interior of said building unit preventing a penetration of moisture and dust thereto.

5. A piezo-electric building unit as defined in claim 1 wherein said second metallized surface extends around the peripheral surface of said discs and is spaced from said first conductive surface additionally by a second annular gap disposed on the side of said disc opposite the first annular gap and being removed from the peripheral edge of said disc so as to be enclosed in the interior of said building unit.

6. A piezo-electric building unit as defined in claim 5 wherein said aperture in said base plate is provided with a third conductive surface forming an extension of said conductive tube and being provided with conductive lugs.

7. A piezo-electric building unit as defined in claim 6 wherein said base plate is made of a conductive metal and said aperture therein being formed by an insulating tube extending therethrough.

8. A piezo-electric building unit as defined in claim 5 wherein said cover plate is made of a highly insulating material.

9. A piezo-electric building unit as defined in claim 5 wherein said base plate and said cover plate are made of piezo-electric material and are provided with a fourth conductive surface on both sides thereof and extending continuously around the peripheral surface thereof to electrically short circuit said base plate and said cover plate.

10. A piezo-electric building unit as defined in claim 9 wherein said discs include indicator means for circumferentially orienting said discs to achieve the lowest internal stresses as a result of temperature.

11. A piezo-electric building unit as defined in claim 1 wherein said metallized layers consist of superposed layers of silver and gold.

12. A piezo-electric building unit as defined in claim 1 wherein said discs, said base plate and said cover plate are welded together in an aligned stack.

13. A piezo-electric building unit as defined in claim 1 wherein said stack of discs with said base plate on one end and said cover plate on the other end is held together in a coherent unit by a coating of silicon varnish thereon.

14. A piezo-electric building unit as defined in claim 12 further including a diaphragm coated with a layer of gold on one side thereof, said cover plate being secured to said one side of said diaphragm.

15. A piezo-electric building unit as defined in claim 1 further including a body member in direct contact with said base plate for housing said unit and an output electrode inserted into the aperture in said base plate into electrical contact with said second metallized surface.

References Cited

UNITED STATES PATENTS

| | | | |
|---|---|---|---|
| 2,453,435 | 11/1948 | Haustad | 310—9.1 |
| 2,586,854 | 2/1952 | Myers | 333—70 |
| 2,988,728 | 6/1961 | Marlow | 340—10 |
| 3,171,989 | 3/1965 | Hatschek | 310—8.7 |

J. D. MILLER, *Primary Examiner.*